United States Patent [19]

Pocklington

[11] 4,145,045

[45] Mar. 20, 1979

[54] PRESSURELESS TENNIS BALL

[75] Inventor: Terence W. Pocklington, Tupelo, Miss.

[73] Assignee: Colgate-Palmolive Company, New York, N.Y.

[21] Appl. No.: 822,968

[22] Filed: Aug. 8, 1977

[51] Int. Cl.$^2$ .............................................. A63B 39/00
[52] U.S. Cl. ..................................... 273/61 C; 260/5; 260/998.14
[58] Field of Search .............................. 260/5, 998.14; 273/61 C

[56] References Cited

U.S. PATENT DOCUMENTS

| 3,454,280 | 7/1969 | Harrison et al. | 260/998.14 |
| 3,940,146 | 2/1976 | Little | 260/998.14 |
| 4,056,269 | 11/1977 | Pollitt et al. | 260/998.14 |

FOREIGN PATENT DOCUMENTS

| 755496 | 3/1967 | Canada | 273/61 C |
| 766997 | 9/1967 | Canada | 273/61 C |
| 1478023 | 1/1970 | Fed. Rep. of Germany | 273/61 C |

OTHER PUBLICATIONS

The Condensed Chemical Dictionary, Eighth Edition, Van Nostrand Reinhold Co., 1971, p. 841.

*Primary Examiner*—Allan Lieberman
*Attorney, Agent, or Firm*—Herbert S. Sylvester; Murray M. Grill; Kenneth A. Kock

[57] ABSTRACT

A pressureless tennis ball based on an elastomeric composition including natural rubber, cis 1,4-polybutadiene, and a copolymer of ethylene and at least one unsaturated monocarboxylic acid containing from three to eight carbon atoms, said copolymer containing up to 30 percent by weight of said acid.

10 Claims, No Drawings

PRESSURELESS TENNIS BALL

BACKGROUND OF THE INVENTION

The present invention relates to playballs, including in particular lawn tennis balls, which will be referred to hereafter as tennis balls.

A tennis ball usually consists of a hollow sphere made of an elastic medium which is usually a composition of rubber or rubber-like material suitably formulated to give properties appropriate to the playball.

Usually the ball, a hollow sphere, contains a gas at a pressure above that of the atmosphere, the excess pressure in the case of a conventional playball usually being of the order of 10–12 pounds per square inch above atmospheric pressure immediately after manufacture. The presence of the gas at this super-atmospheric pressure modifies the properties of the playball so that desirable playing properties are obtained. In particular, the presence of the gas imparts a higher resilience to the playball (i.e., it bounces higher when dropped from a fixed height), and it also increases the resistance of the playball to deformation under a radially applied load, such as, for instance, as applied by a racket when the ball is struck.

It will be appreciated that the above remarks apply equally to a tennis ball which may be regarded as a particular type of playball in which the surface is covered by a textile medium composed of natural and/or synthetic fibers in an arrangement whereby the particular desirable playing properties of a tennis ball are achieved.

Although the super-atmospheric pressure existing inside the playball shell imparts desirable playing properties to the playball, corresponding undesirable characteristics are also attendant which are related to the slow diffusion of gas from the interior of the playball shell due to the differential pressure existing on each side of the wall of the shell. Due to the effect of super-atmospheric internal pressure on the playing qualities of the ball, these qualities change accordingly, and a stage is reached when the playing qualities are unsatisfactory. It is consequently necessary for playballs either to be used within a certain specified time after manufacture, or for the balls to be enclosed in pressurized cans or other containers prior to use so that the pressure differential across the wall of the playball shell is reduced or eliminated. Both procedures entail inconvenience and expense.

It would be appreciated that it would be an advantage if playballs could be manufactured without the difficulties associated with the conventional pressurized playball shell. Such difficulties would be minimized or obviated if the excess pressure inside the playball shell could be substantially reduced or made equal to zero. It will be appreciated that the nearer are the values of pressure on either side of the wall of the shell, the slower is the rate of diffusion of gas from inside the shell. Of course, if the pressures are equal, no diffusion will take place.

If a playball is made with zero super-atmospheric internal pressure, the wall of the shell must contribute significantly to or impart unaided the necessary properties of resilience and resistance to deformation. Satisfactory playballs can be made with zero super-atmospheric pressure (pressureless balls) by using substantially conventional rubber or rubber-like compositions while increasing the wall thickness of the playball shell by an appreciable amount. However, by doing this, the weight of the playball is substantially increased, and in the case of a tennis ball, the resulting weight would be outside the limits set by the controlling authorities. Such a method is therefore not satisfactory.

Pressureless tennis balls are known in the art, and are specifically disclosed in U.S. Pat. Nos. 2,896,949 to Dunker, 3,432,165 to Haines et al, and 4,022,469 to Lacoste et al. However, none of these pressureless tennis balls is made of the combination elastomer which is the basis of the present invention.

SUMMARY OF THE INVENTION

It has now been discovered that a superior pressureless tennis ball can be produced from a mixture of natural rubber, cis 1,4 polybutadiene, and a copolymer of at least one olefin with at least one unsaturated carboxylic acid.

The copolymer is incorporated in the composition to form the tennis ball to provide it with superior properties of resilience and resistance to deformation without increasing the wall thickness of the tennis ball shell.

The copolymers used in the tennis ball according to the present invention are copolymers of at least one olefin with at least one unsaturated carboxylic acid and can be either random copolymers in which the molecular chains are composed of the different monomers polymerized or can be graft copolymers made by polymerizing the unsaturated carboxylic acid monomer onto a backbone molecular chain of the polyolefin. The graft copolymers can be prepared by irradiation, e.g., gamma or ultraviolet radiation, of the mixture of polyolefin and the unsaturated carboxylic acid. The copolymer may, if desired, contain small amounts, e.g., less than 10 percent by weight, of other monomers such as vinyl alkanoic esters, alkyl acrylates and alkyl methacrylates.

Preferably, the olefin contains a small number of carbon atoms in the molecule and a particularly useful copolymer is prepared from ethylene. The unsaturated carboxylic acid can be a dicarboxylic acid but preferably is a monocarboxylic acid, for example acrylic acid, methacrylic acid, itaconic acid, crotonic acid and sorbic acid. Mixtures of different carboxylic acids can be used and metal salts of the acid in which the metal has a valency of from 1 to 4, e.g., sodium or zinc salts, can be used to form terpolymers with the olefin and a free acid. A typical polymer is a terpolymer of ethylene, methacrylic acid and sodium methacrylate.

The copolymers can contain up to 30 percent by weight of the unsaturated carboxylic acid but preferably contain up to 15 percent by weight. If a metal salt of an acid is used, the metal is usually present in an amount of from 10 to 75 percent, preferably 15 to 60 percent and particularly 20 to 50 percent of the stoichiometric equivalent of the carboxylic acid. The copolymers are thermoplastic and have a lower softening point than homopolymers of the olefin.

Preferably, the copolymers contain a number of thermolabile cross-linkages to increase the hardness and stiffness of the solid mixture so produced. This can be achieved by employing a terpolymer with a metal salt of the acid as described above, and/or a cross-linking agent can be introduced into the composition immediately prior to use for the manufacture of the tennis ball or can be introduced some time previously, e.g., a metal salt can be reacted with the copolymer at elevated temperatures such that the volatiles are removed prior to use of the copolymer composition for the manufacture of the cover. The composition containing the thermolabile cross-linkages remains thermoplastic although the viscosity of the molten composition is greater than that of a composition which does not contain the thermolabile cross-linkages. The cross-linked composition has an increased hardness and toughness as compared to a non-cross-linked composition.

The cross-linking agent used to introduce the thermolabile cross-linkages into the copolymer composition is an inorganic or organic metal compound that allows the metal ions to become associated with the reactive carboxyl groups in the polymer and typical metal compounds are the acetates, oxides, carbonates and hydroxides. Preferably, mono- or divalent metal compounds are used, and examples of suitable compounds are the acetates of sodium and potassium, or the oxides of calcium, magnesium and zinc. Compounds of trivalent and tetravalent metals such as aluminum or lead may also be used.

The amount of cross-linking agent that is mixed with the copolymer is less than that theoretically required to react with all the acid groups in the copolymer and usually is less than 75 percent of stoichiometric equivalent of the carboxylic acid. Preferably, 15 to 60 percent, particularly 20 to 50 percent, of the stoichiometric equivalent of the carboxylic acid is used.

The copolymer described above adds hardness to the tennis ball to prevent deformation of the tennis ball, thus there is no need for pressure in the tennis balls according to the present invention to increase the hardness of the tennis ball. As is known, the hardness of the ball lessens the rebound of the ball.

The cis 1,4 polybutadiene and the natural rubber in the formulation according to the present invention are used to provide resilience to the ball, resulting in rebound. In the tennis balls according to the present invention, the natural rubber, the cis 1,4 polybutadiene, and the copolymer are combined to provide the desired combination of resilience and hardness to the ball, resulting in a ball with the proper rebound characteristics, as governed by the U.S. Lawn Tennis Association.

The natural rubber comprises about 10-30 percent by weight of the elastomers, preferably about 20 percent. The cis 1,4 polybutadiene comprises from 50 to 90 percent by weight of the elastomers, preferably about 60 percent. The copolymer comprises about 10 to 30 percent by weight of the elastomers, preferably about 20 percent.

The compositions used to form the tennis balls of the present invention are vulcanized with sulfur, a standard vulcanizing agent for producing thermal cross-linking. The more sulfur present in the composition, the higher the degree of cross-linking upon vulcanization. The tennis balls of the present invention require a high degree of cross-linking to provide the superior hardness and resilience needed for a pressureless tennis ball. In formulating the composition to produce tennis balls according to the present invention, at least two parts by weight of sulfur per 100 parts by weight of elastomers (mixture of cis 1.4 polybutadiene, copolymer and natural rubber) are required, with a maximum of 25 parts by weight of sulfur per 100 parts by weight of elastomers. Preferably, the tennis balls are made with from 5 to 10 parts by weight of sulfur per 100 parts by weight of elastomers.

An antioxidant can be incorporated in the tennis balls of the present invention, in amounts ranging from about 0.5 parts by weight per 100 parts of elastomers to 1.00 parts by weight per 100 parts of elastomer. A preferred antioxidant is a dialkyl phenol sulfide.

A preferred activator for the tennis ball composition according to the present invention is a mixture of zinc oxide and stearic acid, with a weight ratio of zinc oxide to stearic acid ranging from 10:1 to 30:1, and preferably about 20:1. The activator is present in the tennis ball compositions in amounts of 3 to 8 parts by weight per 100 parts by weight of elastomers.

In addition to the zinc oxide/stearic acid activator, diphenyl guanadine, in amounts ranging form 0.5 to 3 parts by weight per 100 parts by weight of elastomers may be used. A preferred amount is one part by weight of diphenyl quanidine per 100 parts by weight of elastomers. In addition, N-cyclohexyl-2-benzothiozole sulfenamide may also be incorporated in the compositions in amounts ranging from 0.5 to 5 parts by weight per 100 parts by weight of elastomers.

The tennis balls of the present invention are made by heating the copolymer to 150°-160° F to melt it and adding it to the other ingredients at this temperature. The composition is mixed thoroughly and then sheeted on a mill. The composition is removed from the mill, extruded into rod form, and cut into plugs. The plugs are placed in standard compression molds for tennis balls and molded to form hemispheres. The ingredients are cured during the molding process. The two hemispheres are joined to form a ball and are provided with a felt covering.

DETAILED DESCRIPTION OF THE INVENTION

EXAMPLE I

A pressureless tennis ball was made by mixing together in an internal rubber mixer, at 150°-160° F., until blended, the following ingredients:

|  | Parts by Weight |
|---|---|
| Natural Rubber | 20.00 |
| Cis 1.4 polybutadiene | 80.00 |
| Copolymer* | 25.00 |
| Zinc Oxide | 5.00 |
| Stearic Acid | 0.25 |
| Santowhite** | 1.00 |
| Santocure*** | 2.00 |
| Diphenyl Guanidine | 1.00 |
| Sulfur | 5.00 |
|  | 139.25 |

*Copolymer of ethylene and up to 30 percent of a $C_3$-$C_8$ unsaturated monocarboxylic acid. Twenty-five parts comprising 12.5 parts SURLYN A 1855 and 12.5 parts SURLYN A 1554. SURLYN is a trademark for copolymers of this type and is available from E. I. DuPont Company; Wilmington, Delaware.
**Dialkyl phenol sulfide
***N-cyclohexyl-2-benzothiozole sulfenamide.

When the composition was blended it was placed onto a conveyor to a mill for sheeting. The mixture was extruded into rod form and cut into plugs to fit a conventional tennis ball mold. The plugs were introduced into the tennis ball mold and molded by standard compression molding techniques to form hemispheres. For each tennis ball, two hemispheres were joined together and then covered with a felt covering according to the conventional procedures for making tennis balls. According to the invention the usual step providing the ball with an internal pressure during the step of joining the hemisphere can be omitted.

EXAMPLE II

Tennis balls are made according to the procedure of Example I with the following ingredients:

|  | Parts by Weight |
| --- | --- |
| Natural Rubber | 20.00 |
| Cis 1,4 polybutadiene | 80.00 |
| Copolymer | 35.00 |
| Zinc Oxide | 4.50 |
| Stearic Acid | 0.75 |
| Santowhite | 1.00 |
| Santocure | 2.00 |
| Diphenyl Guanidine | 1.00 |
| Sulfur | 10.00 |

The pressureless tennis balls made according to the present invention have been found to meet all of the requirements of the U.S. Lawn Tennis Association. This Association provides the following regulations for tennis balls:

Ball—Size, Weight and Bound

The ball shall have a uniform outer surface and shall be white or yellow in color. If there are any seams they shall be stitchless. The ball shall be more than 2¼ inches and less than 2⅝ inches in diameter, and more than two ounces and less than 2 1/16 ounces in weight. The ball shall have a bound of more than 53 inches and less than 58 inches when droped 100 inches upon a concrete base. The ball shall have a forward deformation of more than 0.230 of an inch and less than 0.290 of an inch and a return deformation of more than 0.355 of an inch and less than 0.425 of an inch at 18 lb. load. The two deformation figures shall be the averages of three individual readings along three axes of the ball and no two individreadings shall differ by more than 0.030 of an inch in each case.

What is claimed is:

1. A pressureless tennis ball comprising a hollow sphere based on a vulcanized elastomeric composition including from about 10 percent to about 30 percent by weight natural rubber, from about 50 percent to about 80 percent by weight of cis 1,4 polybutadiene, and from about 10 percent to about 30 percent by weight of a copolymer of ethylene and at least one unsaturated monocarboxylic acid containing from three to eight carbon atoms, said copolymer containing up to 30 percent by weight of said acid, said copolymer including a cross linking agent chosen from the group consisting of inorganic and organic metal compounds that allow the metal ions to become associated with the reactive carboxyl groups of said copolymer.

2. A tennis ball according to claim 1 wherein the monocarboxylic acid is selected from the group consisting of acrylic acid and methacrylic acid.

3. A tennis ball according to claim 1 containing 20 percent by weight natural rubber, 60 percent by weight cis 1,4 polybutadiene, and 20 percent copolymer.

4. A tennis ball according to claim 1 wherein the elastomeric composition is vulcanized with sulfur.

5. A tennis ball according to claim 4 wherein the sulfur is present in amounts ranging from about 2 parts to about 25 parts by weight per 100 parts by weight of the elastomeric composition.

6. A tennis ball according to claim 5 wherein the sulfur is present in amounts ranging from about 5 to 10 parts by weight per 100 parts by weight of the elastomeric composition.

7. A tennis ball according to claim 1 provided with a textile or felt covering.

8. A tennis ball according to the claim 1 wherein said cross-linking agent is present in an amount less than 75 percent of the stoichiometric equivalent of the carboxylic acid present in said copolymer.

9. A tennis ball according to claim 8 wherein said cross-linking agent is chosen from the group consisting of the acetates of sodium and potassium and the oxides of calcium magnesium and zinc.

10. A pressureless tennis ball comprising a hollow sphere based on a vulcanized elastomeric composition including from about 10 percent to about 30 percent by weight natural rubber, from about 50 percent to about 80 percent by weight of cis 1,4 polybutadiene and from about 10 percent to about 30 percent by weight of a copolymer of ethylene and at least one unsaturated monocarboxylic acid containing from three to eight carbon atoms and selected from the group consisting of acrylic acid and methacrylic acid, said copolymer including a cross-linking agent chosen from the group consisting of the acetates of sodium and potassium and the oxides of calcium, magnesium and zinc, said cross-linking agent being present in an amount less than 75 percent of the stoichiometric equivalent of the carboxylic acid present in said copolymer, said elastomeric composition being vulcanized with sulfur, said sulfur being present in amounts ranging from about 2 parts to about 25 parts by weight per 100 parts by weight of the elastomeric composition.

* * * * *